United States Patent

Alex

[11] Patent Number: 5,697,491
[45] Date of Patent: Dec. 16, 1997

[54] FOOD CONVEYOR BELTS

[75] Inventor: Patrick Alex, Limours Pecquese, France

[73] Assignee: Elf Atochem S.A., Puteaux, France

[21] Appl. No.: 342,946

[22] Filed: Nov. 21, 1994

[30] Foreign Application Priority Data

Nov. 30, 1993 [FR] France ................. 93 14296

[51] Int. Cl.⁶ ............................................. B65G 15/34
[52] U.S. Cl. ............................. 198/846; 198/847
[58] Field of Search .......................... 198/846, 847, 198/957; 474/264

[56] References Cited

U.S. PATENT DOCUMENTS

| | | | |
|---|---|---|---|
| 2,805,182 | 9/1957 | Hallenbeck | 198/957 X |
| 3,871,946 | 3/1975 | Romanski et al. | 198/846 X |
| 4,287,984 | 9/1981 | Okamoto et al. | 198/847 |
| 4,371,580 | 2/1983 | Morrison et al. | 198/847 X |
| 4,469,729 | 9/1984 | Watanabe et al. | 198/846 X |
| 4,500,666 | 2/1985 | Wada | 198/846 X |
| 4,979,591 | 12/1990 | Habegger et al. | 186/68 |
| 5,244,080 | 9/1993 | Bierbaum | 198/502.1 |
| 5,421,450 | 6/1995 | Kitagawa et al. | 198/957 X |

FOREIGN PATENT DOCUMENTS

| | | | |
|---|---|---|---|
| 3802963 | 8/1988 | Germany | 198/857 |
| 1022240 | 3/1966 | United Kingdom | 474/264 |
| WO 92/10694 | 6/1992 | WIPO | |

*Primary Examiner*—David A. Bucci
*Attorney, Agent, or Firm*—Pennie & Edmonds

[57] ABSTRACT

The subject of the invention is a conveyor belt comprising an outer polyamide layer and an inner layer of a thermoplastic block polymer, intended to be used in particular in the food or agri-foodstuff industry.

11 Claims, 1 Drawing Sheet

FOOD CONVEYOR BELTS

FIELD OF THE INVENTION

The invention relates to novel conveyor belts, especially for food articles.

BACKGROUND OF THE INVENTION

In many processes, it is necessary to bring articles from one point in a unit to another, or to place articles on a "line" so that they undergo various treatments or manipulations. Thus conveyor belts are used in the agri-foodstuff sector, for example.

In this sector of activity, conveyor belts must possess the qualities generally required. Thus, conveyor belts are sought which have a high resistance to reverse bending, elastic resistance, flexibility, surface resistance to various attacking agents and under various conditions, etc. Conveyor belts must be easy to install and to change, whilst not having weak points, normally located at the joins. Moreover, in the agri-foodstuff sector, a conveyor belt must, in addition, have a food-grade quality and must resist agents such as fats, whether animal or vegetable, etc., and must also permit easy cleaning. Finally, it is advantageous, in cases where the conveyor belt is used as a support for a manufacturing line, to provide a decoration, for example a drawing, on the belt in order to indicate, to the people working on the said line, the place where to put and/or from where to take the article, especially a food article.

Many documents mention a fabric or textile as inner core of the conveyor belts so as to confer on them the required mechanical strength, the said textile being subsequently embedded in an elastic material, such as a rubber. However, such textiles are expensive and especially need to be covered, particularly with suitable polymers. The manufacturing cost is therefore high. Moreover, in order to confer the required circularity for the conveyor belts, it is necessary to superpose the ends of the belt, which creates a local extra thickness at the join of the belt. This extra thickness causes problems. Thus, EP-A-489,694 describes a conveyor belt which possesses a central inner textile layer so as to confer the required mechanical properties, this layer being covered with thermoplastic elastomer polymers. Such a polymer, known in the conveyor belt art, is, for example, polyurethane.

Japanese Patents JP-A-86/307330 and JP-A-86/207813 describe belts for power transmission and for transporting, these being obtained from mixtures of polymers. These mixtures of polymers are, for example, mixtures of polyamides with polyethers, or mixtures of polyamides with polyamide/polyether copolymers.

U.S. Pat. No. 4,979,591 describes a conveyor belt for supermarket check-outs, possessing a transparent surface below which there are drawings intended for advertising purposes. These drawings are applied by ink transfer, or by screen printing, and are then covered with a transparent layer. This mode of manufacture always requires a textile and involves several manufacturing steps.

In addition, when the conveyor belts comprise polymers, it is necessary that these be compatible with each other, this often turning out to be difficult given the objectives to be achieved. Compatibilizers or binders are sometimes added, which increases the complexity of the manufacturing process and its cost.

Thus, a need exists for a conveyor belt, particularly for the food sector, which has the required mechanical qualities for any conveyor belt, and in particular specific food-quality characteristics related to the agri-foodstuff sector, which does not involve an extra thickness at the join of the belt and which can, should it be needed, be easily decorated.

None of the above documents teaches or suggests the present invention.

SUMMARY OF THE INVENTION

The present invention provides a conveyor belt comprising an outer, product contact layer and an inner layer that does not contact product transported on said conveyor belt. The outer layer of the conveyor is composed of polyamide and the inner layer thereof is composed of thermoplastic block polymer. The conveyor belt of the invention may optionally further comprise a reinforcement layer, such as of polyester fibers, between the outer layer and the inner layer.

The present invention also contemplates a method of making such conveyor belts which comprises coextruding the polyamide and the thermoplastic block polymer in a sheet die to form a laminate having two long edges and two short edges, trimming each of said two long edges to provide a laminate having a width commensurate with the desired width of said conveyor belt, trimming each of said two short edges to provide a laminate having a length commensurate with the desired length of said conveyor belt, abutting said two short edges to form a cylindroid such that the polyamide is on the outside of said cylindroid, and applying heat or ultrasound to the abutted joint of said two short edges sufficient to effect welding of the thermoplastic polymers that constitute said conveyor belt.

The conveyor belt of the present invention can be used in all types of industry. It is particularly well-suited for use in the food and agri-foodstuff industries. A further aspect of this invention is a method of transporting a food or agricultural product from one position to another which comprises positioning said food or agricultural product on the outer layer of a conveyor belt of the invention and causing said conveyor belt to move such that said food or agricultural product is transported to a position different from its starting position.

DESCRIPTION OF THE PREFERRED EMBODIMENTS

Figure 1:
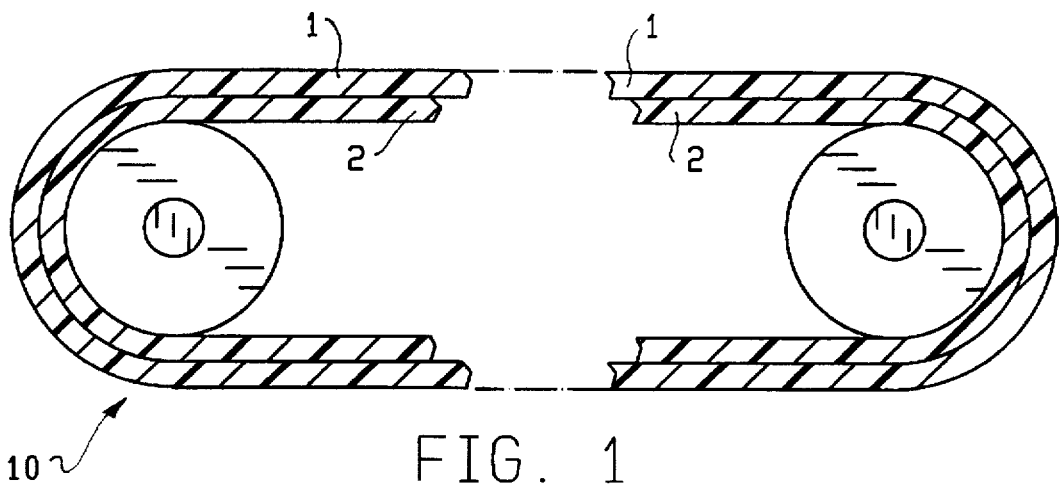
FIG. 1 is a schematic cross-section of a first conveyor belt in accordance with the present invention.

As illustrated in FIG. 1, the present invention provides a conveyor belt 10 comprising an outer polyamide layer 1 and an inner layer of a block polymer 2.

The Inner Layer

This term "block polymer" covers thermoplastic polymers in which at least one unit is in the form of blocks. The blocks are, for example, soft segments such as polymerdiols. Examples of block polymers within the scope of the present invention are: polyetherester (Hytrel®), polyetherurethane, polyesterurethane, polyetheresterurethane, polyetherblock-amide (or also called polyetheresteramide), by themselves or as a mixture. The preferred block polymer is polyetheresteramide (PEEA).

According to one embodiment of the invention, then, the inner layer in the conveyor belt is a polyetheresteramide layer. The PEEA has the following general formula:

in which PA represents the polyamide segment, PE represents the polyether segment, and n is an integer representing the distribution of the repeat units. An example of PEEA which can be used is the PEEA available commercially under the name "Pebax®" and manufactured by the company ELF ATOCHEM S.A.

The Outer Layer

The term "polyamide" as used in the present invention covers any polyamide, homopolymer, copolymer, mixtures and blends, in proportions known to the person skilled in the art. Examples of polyamides are: PA11, PA12, PA6, PA6,6, PA6,12, SAPA (semi-aromatic polyamide), their copolymers and their mixtures. By mixture is meant mixtures of polyamides with fillers or additives known to the person skilled in the art, in conventional proportions.

According to a preferred embodiment of the present invention, the outer layer in the conveyor belt is based on a food-grade polyamide. By "food-grade polyamide" is meant a polyamide which can be used in contact with food, for animals or preferably for humans. According to a variant, the food-grade polyamide is PA11. The polyamide PA11 is available commercially under the name "Rilsan®", manufactured by the company ELF ATOCHEM S.A. When the polyamide is of food-grade quality, the conveyor belt can advantageously be used in the food and/or agri-foodstuff sector.

According to a preferred embodiment, the conveyor belt is composed of a layer of PA11 (Rilsan®) and of a layer of PEEA (Pebax®).

Construction of the Belt

The layers of the conveyor belt according to the present invention have thicknesses which can be varied depending on the use; however, common thicknesses do exist.

According to one embodiment of the invention, the polyamide layer 1 possesses a thickness of between 5 and 500 μm, advantageously between 10 and 250 pm, for example approximately 50 μm.

According to another embodiment, the block polymer layer 2 possesses a thickness of between 0.2 and 20 mm, advantageously between 0.4 and 10 mm, for example approximately 2 mmm.

Figure 2:
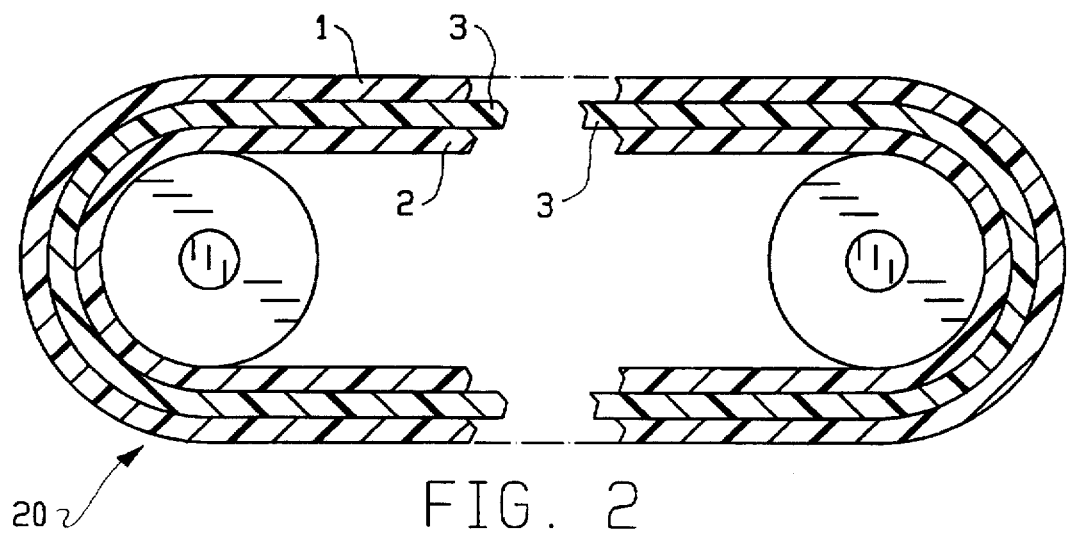
FIG. 2 is a schematic cross-section of a second conveyor belt in accordance with the present invention.

The belt according to the invention may comprise other additional layers, such as textile layers, reinforcement layers (Kevlar polyester), filaments, in particular polyester filaments which can be incorporated at extrusion. The person skilled in the art will appreciate, depending on the conditions of use, the possible presence of reinforcements in the belt according to the invention. FIG. 2 shows a belt 20 reinforced with a layer of polyester filaments 3.

Figure 3:
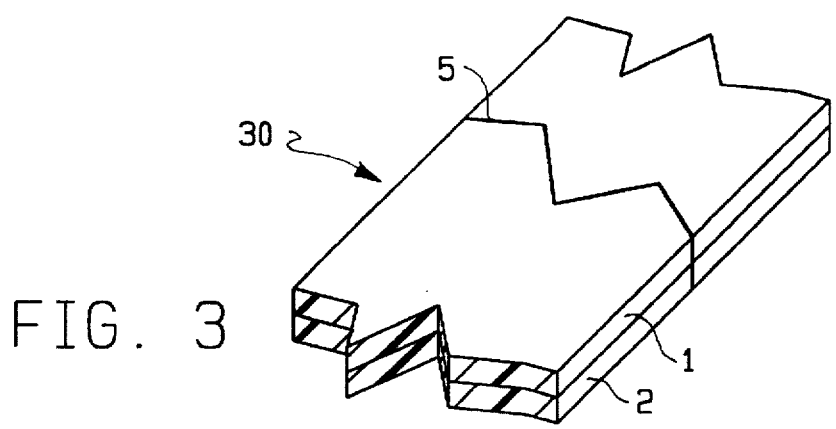
FIG. 3 is a perspective view of a portion of a conveyor belt in accordance with the present invention, illustrating a weld joint therein.

The conveyor belt according to the invention may be welded to itself by virtue of the presence of the constituent thermoplastic polymers. The welding may be carried out using heat or using ultrasound, in a way known in the art. This "butt" welding makes it possible to avoid any extra thickness, in particular one that is harmful. This welding can be envisaged according to the technique called "finger splicing", which consists in cutting the edges in the manner of saw teeth having corresponding profiles which engage in each other. FIG. 3 shows a partial section of a belt 30 illustrating the weld site 5 to be finger spliced prior to the application of heat or ultrasound to the weld area.

The conveyor belt is manufactured by any process known in the art of polymers. Preferably, the belts are manufactured by coextrusion of the constituents in a sheet die. Thus, the subject of the invention is also this conveyor belt obtained by coextrusion of its constituents. The belt may also be manufactured by the joining of two polymer films prepared separately, by any technique known in the art, such as coating with an acrylic resin, and so on. The conveyor belt, or the polymer layers of which it is composed, may be subjected to uniaxial or biaxial stretching.

According to the envisaged mode of manufacture, it is possible to print a relief on the outer polyamide layer which lends itself well to relief. Thus, it is possible to obtain embossing on the external surface of the belt. According to one embodiment of the invention, the conveyor belt has an embossed external surface.

Properties of the Belt

By virtue of the present invention, the conveyor belt possesses the following properties: on the one hand flexibility, resistance to reverse bending, elastic memory, low hysteresis, small radius of curvature, and lightness, and on the other hand resistance to attack by detergents, fats, oils or solvents, food-quality if necessary, resistance to hydrolysis, abrasion strength, surface resistance to high temperatures, resistance to crushing, and so on.

Moreover, the belt according to the invention is cleaned extremely easily since it prevents the fouling-up by deposits or the penetration of dirt.

The belt according to the invention may also have decorative elements, this enabling the belt to be marked. This is of advantage when the belt is used as a support in a line, operatives having to take an object from, or to put it back at, a precise place. Thus, it is possible to mark the outline of the object on the conveyor belt.

The decoration may be made by any suitable technique. However, it is advantageous to use a technique of decoration by sublimation. According to this technique, sublimable pigments are deposited at the surface of a suitable polymer, for example a polyamide, and then, under the effect of heat, migrate into the thickness of the polymer. This technique of decoration by sublimation is known to the person skilled in the art; reference may be made, for example, to Patent FR-A-2,387,793.

The conveyor belt is used in all types of industry, in particular the food and agri-foodstuff industry.

While this invention has been described and illustrated with reference to certain specific embodiments thereof, those skilled in the art will be apprised by the principles set forth herein that the invention is not limited to these specific embodiments, and that it encompasses all variations thereof embraced by the appended claims.

What is claimed is:

1. A conveyor belt comprising an outer, product contact layer and an inner layer that does not contact product transported on said conveyor belt, wherein said outer layer is of polyamide and said inner layer is of thermoplastic block copolymer, wherein said thermoplastic block copolymer comprises polyetheresteramide.

2. The conveyor belt of claim 1, wherein the outer layer has an embossed external surface.

3. A conveyor belt comprising an outer, product contact layer and an inner layer that does not contact product transported on said conveyor belt, wherein said outer layer is of polyamide and said inner layer is of thermoplastic block copolymer, in which the block copolymer is of polyetheresteramide.

4. The conveyor belt of claim 3, in which the polyamide is a food-grade polyamide.

5. The conveyor belt of claim 4, in which the food-grade polyamide is PA11.

6. The conveyor belt of claim 3, in which the polyamide layer has a thickness of between 5 and 500 μm.

7. The conveyor belt of claim 6, in which the polyamide layer has a thickness of between 10 and 250 μm.

8. The conveyor belt of claim 3, in which the block polymer layer has a thickness of between 0.2 and 20 mm.

9. The conveyor belt of claim 3, in which the block polymer layer has a thickness of between 0.4 and 10 mm.

10. The conveyor belt of claim 3, further comprising a reinforcement layer of polyester between the outer layer and the inner layer.

11. A method of transporting a food or agricultural product from one position to another which comprises positioning said food or agricultural product on the outer layer of a conveyor belt comprising an outer, product contact layer and an inner layer that does not contact product transported on said conveyor belt, wherein said outer layer is of polyamide and said inner layer is of thermoplastic block copolymer and causing said conveyor belt to move such that said food or agricultural product is transported to a position different from its starting position, wherein said thermoplastic block copolymer comprises polyetheresteramide.

* * * * *